United States Patent
Nay et al.

(10) Patent No.: US 12,193,443 B2
(45) Date of Patent: Jan. 14, 2025

(54) USE OF BENZOXEPIN DERIVATIVES AS A HERBICIDE

(71) Applicants: ECOLE POLYTECHNIQUE, Palaiseau (FR); CENTRE NATIONAL DE LA RECHERCHE SCIENTIFIQUE, Paris (FR); SORBONNE UNIVERSITE, Paris (FR)

(72) Inventors: Bastien Nay, Paris (FR); Emmanuel Baudouin, Thiais (FR); Wei Zhang, Charenton le Pont (FR)

(73) Assignees: ECOLE POLYTECHNIQUE, Palaiseau (FR); CENTRE NATIONAL DE LA RECHERCHE SCIENTIFIQUE, Paris (FR); SORBONNE UNIVERSITE, Paris (FR)

( * ) Notice: Subject to any disclaimer, the term of this patent is extended or adjusted under 35 U.S.C. 154(b) by 524 days.

(21) Appl. No.: 17/603,086

(22) PCT Filed: Mar. 16, 2020

(86) PCT No.: PCT/EP2020/057141
§ 371 (c)(1),
(2) Date: Oct. 12, 2021

(87) PCT Pub. No.: WO2020/207714
PCT Pub. Date: Oct. 15, 2020

(65) Prior Publication Data
US 2022/0183292 A1    Jun. 16, 2022

(30) Foreign Application Priority Data
Apr. 12, 2019  (FR) ..................... 1903962

(51) Int. Cl.
*A01N 43/22* (2006.01)
*A01P 13/00* (2006.01)
*A01N 43/46* (2006.01)

(52) U.S. Cl.
CPC .............. *A01N 43/22* (2013.01); *A01P 13/00* (2021.08)

(58) Field of Classification Search
CPC ................................ A01N 43/22; A01N 43/46
See application file for complete search history.

(56) References Cited

FOREIGN PATENT DOCUMENTS

| CA | 1222755 A | 6/1987 |
| JP | 2005112739 A | * 4/2005 |

OTHER PUBLICATIONS

International Search Report (ISR) for PCT/EP2020/057141 mailed Apr. 9, 2020 with English Translation (5 pages).

Written Opinion for PCT/EP2020/057141 mailed Apr. 9, 2020 with English Translation (10 pages).
Asakawa et al. "New Bibenzyls from Radula Complanata" PHYTOCHEMISTRY, vol. 17, No. 12, Jan. 1, 1978 (Jan. 1, 1978), pp. 2115-2117.
Macias et al. "Synthesis of Heliannane Skeletons. Facile preparation of (+/−)-heliannuol D"; Tetrahedron, Elsevier Science Publishers, Amsterdam, NL, vol. 59, No. 10, Mar. 3, 2003 (Mar. 3, 2003), pp. 1679-1683.
Asakawa et al. "Bibenzyls from Radula Tokiensis and R. Japonica" Phytochemistry, vol. 20, No. 4, Jan. 1, 1981, pp. 858-859.
Yoshida et al. "Total synthesis of radulanin H and proposed structure of radulanin E"; Tetrahedron, vol. 65 (2009) pp. 5702-5708.
Asakawa et al., "Novel Bibenzyl Derivatives and Ent-Cup Arene-Type Sesquiterpenoids From Radula Species" Phytochemistry, vol. 21, No. 10, 1982, pp. 2481-2490.
Valio et al. "New Natural Growth Inhibitor in the Liverwort Lunularia cruciata (L) Dum." Nature, vol. 223, Sep. 13, 1969, pp. 1176-1178.
Yamaguchi et al. "Synthesis of Two Naturally Occurring 3-Methyl-2,5-dihydro-1-benzoxepin Carboxylic Acids" J. Org. Chem., vol. 70, 2005, pp. 7505-7511.
Yamaguchi et al. "A new preparation of 2,5-dihydro-1-benzoxepins using Mitsunobu cyclization, and the synthesis of natural radulanins"; Tetrahedron, vol. 41, 2000, pp. 4787-4790.
Yoshikawa et al. "The Biological and Structural Similarity between Lunularic Acid and Abscisic Acid"; Bioscience, Biotechnology, and Biochemistry, vol. 66, No. 4, 2002, pp. 840-846.
Stefinovic et al. "Connecting Directed Ortho Metalation and Olefin Metathesis Strategies. Benzene-Fused Multiring-Sized Oxygen Heterocycles. First Syntheses of Radulanin A and Helianane"; J. Org. Chem., vol. 63, 1998, pp. 2808-2809.

(Continued)

*Primary Examiner* — Robert A Wax
*Assistant Examiner* — Danielle Johnson
(74) *Attorney, Agent, or Firm* — Shumaker, Loop & Kendrick, LLP

(57) ABSTRACT

The invention relates to the use, as a herbicide, of at least one compound chosen from the compounds of general formula (I)

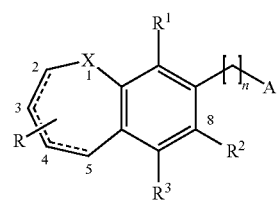

and organic or inorganic salts thereof and isomers thereof.

The invention also relates to a phytotoxic composition and to a method for controlling the development of and/or treating undesirable plants on the surface of a target zone.

25 Claims, No Drawings

(56) References Cited

OTHER PUBLICATIONS

Asakawa et al. "Prenyl Bibenzyls From the Liverworts Radula Perrottetii and Radula Complanata"; Phytochemistry, vol. 30, No. 1, 1991, pp. 235-251.
Asakawa et al. "Seven New Bibenzyls and a Dihydrochalcone From Radula Variabilis"; Phytochemistry, vol. 17, 1978; pp. 2005-2010.

* cited by examiner

USE OF BENZOXEPIN DERIVATIVES AS A HERBICIDE

TECHNICAL FIELD

The present invention relates to the field of herbicides useful for combating the proliferation of undesirable plants. The invention is in particular directed to the use of benzoxepin derivatives as a herbicide.

BACKGROUND

A herbicide is a chemical product in the form of an active substance or a phytosanitary composition which is effective for combating the proliferation of undesirable plants.

A herbicide can in particular be said to be total if it destroys all kinds of plants or said to be selective if it kills only one or more categories of undesirable plants. Likewise, it can be qualified through its mode of action, for example root-penetrating, systemic or post-emergence.

A "root-penetrating herbicide" is a herbicide which acts by being absorbed by the roots of the plant, whereas a "foliar herbicide" is absorbed by the plant at the leaves.

A "systemic herbicide" acts by diffusing throughout the plant via the sap, as opposed to a "contact herbicide" which destroys only the surfaces to which it is applied and with which it is therefore in contact.

Lastly, a "post-emergence herbicide" acts on the plant after the emergence of the first seedlings, while a "pre-emergence herbicide" acts as soon as they germinate.

The herbicides currently in use are mainly of synthetic origin, such as in particular aromatic compounds, compounds with heterocycle structure, or glyphosate. However, the safety of these compounds with regard to the environment is clearly in question nowadays.

There is therefore a need to have available new herbicides that are effective with regard to undesirable plants but the side effects of which with regard to the environment are, on the other hand, significantly reduced compared to those mentioned above.

One approach for meeting these expectations is to consider using compounds "of natural origin" that can be more readily assimilated by the environment.

For instance, lunularic acid, which is of natural origin, has for example been identified as promoting the dormancy of the plant *Lunularia cruciata* (Valio et al., Nature 1969, 223, 1176-1178) with a mechanism targeting the abscisic acid pathway in plants (Yoshikawa et al., Biosci. Biotechnol. Biochem. 2002, 66 840-846). However, for many applications it is not sufficient to stop the growth of the plant.

The aim of the present invention is therefore primarily to provide a new class of herbicides meeting these expectations.

SUMMARY

Thus, a first subject of the present invention is the use, as a herbicide, of at least one compound chosen from the compounds of general formula (I)

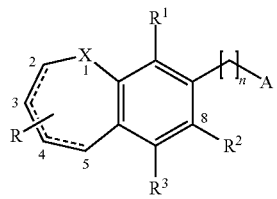

in which
n is an integer greater than or equal to 0,
X represents an atom chosen from O and S, or a divalent group chosen from —SO—, —SO$_2$— and —NR'— with R' being a hydrogen atom or a C$_1$ to C$_5$ alkyl or cycloalkyl radical, or aryl radical,
R$^1$, R$^2$, R$^3$ and R independently of one another represent a hydrogen or halogen atom, a C$_1$ to C$_5$ alkyl or cycloalkyl radical or a group chosen from —OH, —COOH, —COOR", —OR" and —SO$_2$R", with R" being a C$_1$ to C$_5$ alkyl or cycloalkyl radical, with alkyl or cycloalkyl radicals optionally substituted by one or more halogen atoms or hydroxyl groups,
the symbol ═ indicates a single bond or a double bond in position 2, 3 or 4 of the 7-membered fused heterocycle, with at least one double bond being present, and
A represents a radical chosen from phenyl, naphthyl, furyl, thiophenyl, pyrrolyl, pyridinyl, indolyl, isoindolyl, benzofuryl, benzothiophenyl, quinolyl, isoquinolyl, imidazolyl, oxazolyl, thiazolyl, pyrimidyl, pyridazyl, pyrazyl, pyrazolyl, or triazolyl radicals, optionally substituted by one or more halogen atoms, by one or more groups chosen from —OH, —COOH, —COOR''', —OR''' and —SO$_2$R''', with R''' being a C$_1$ to C$_5$ alkyl or cycloalkyl radical, or by one or more C$_1$ to C$_5$ alkyl or cycloalkyl radicals optionally substituted by one or more halogen atoms or hydroxyl groups, and organic or inorganic salts thereof and isomers thereof.

Against all expectations, the inventors have specifically discovered that the compounds of general formula (I), which are benzoxepin derivatives related to radulanin, that is to say a compound occurring naturally in hepatic plants, exhibit significant herbicidal activity.

Admittedly, document CA 1 222 755 does suggest the use of benzoxepinsulfonamide derivatives as a herbicide. However, the compounds according to the invention are distinguished from these earlier derivatives by the presence of an arylalkyl unit at the benzoxepin ring. As a matter of fact, as illustrated in the examples below, the presence of such a unit significantly enhances the herbicidal activity of these compounds after 24 h with regard to so-called undesirable plants.

According to another of its aspects, the present invention relates to a phytotoxic composition comprising, in particular as a herbicidal active substance, at least one compound chosen from the compounds of general formula (I) as defined above and also organic or inorganic salts thereof and isomers thereof, in combination with at least one additive chosen from fertilizers, growth regulators and auxiliary herbicides.

According to another of its aspects, the present invention relates to a method for controlling the development of and/or treating undesirable plants on the surface of a target zone, comprising contacting the target zone with an effective amount of at least one compound chosen from the compounds of general formula (I) as defined above, and also organic or inorganic salts thereof and isomers thereof, or at least one phytotoxic composition as defined above.

Other characteristics, variants and advantages of the use of the phytotoxic composition or of the method according to the invention will become more clearly apparent on reading the detailed description and the examples which follow, these being given by way of illustration and not limiting the invention.

In the remainder of the text, the expressions "between . . . and . . . ", "ranging from . . . to . . . " and "varying from . . . to . . . " are equivalent and are intended to mean that the limits are included, unless mentioned otherwise.

Unless indicated otherwise, the expression "including/comprising a(n)" should be understood as "including/comprising at least one".

DETAILED DESCRIPTION

As specified above, a first subject of the present invention is the use, as a herbicide, of at least one compound chosen from the compounds of general formula (I)

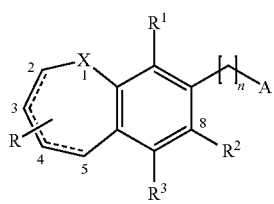

in which
n is an integer greater than or equal to 0,
X represents an atom chosen from O and S, or a divalent group chosen from —SO—, —SO$_2$— and —NR'— with R' being a hydrogen atom or a C$_1$ to C$_5$ alkyl or cycloalkyl radical, or aryl radical,
R$^1$, R$^2$, R$^3$ and R independently of one another represent a hydrogen or halogen atom, a C$_1$ to C$_5$ alkyl or cycloalkyl radical or a group chosen from —OH, —COOH, —COOR", —OR" and —SO$_2$R", with R" being a C$_1$ to C$_5$ alkyl or cycloalkyl radical, with alkyl or cycloalkyl radicals optionally substituted by one or more halogen atoms or hydroxyl groups,
the symbol ═ indicates a single bond or a double bond in position 2, 3 or 4 of the 7-membered fused heterocycle, with at least one double bond being present, and
A represents a radical chosen from phenyl, naphthyl, furyl, thiophenyl, pyrrolyl, pyridinyl, indolyl, isoindolyl, benzofuryl, benzothiophenyl, quinolyl, isoquinolyl, imidazolyl, oxazolyl, thiazolyl, pyrimidyl, pyridazyl, pyrazyl, pyrazolyl, or triazolyl radicals, optionally substituted by one or more halogen atoms, by one or more groups chosen from —OH, —COOH, —COOR'", —OR'" and —SO$_2$R'", with R'" being a C$_1$ to C$_5$ alkyl or cycloalkyl radical, or by one or more C$_1$ to C$_5$ alkyl or cycloalkyl radicals optionally substituted by one or more halogen atoms or hydroxyl groups,
and organic or inorganic salts thereof and isomers thereof.

As representatives of inorganic salts, mention may very particularly be made of alkali metal and alkaline earth metal salts.

As representatives of organic salts, mention may very particularly be made of ammonium salts.

For the purposes of the invention, the term "isomers" is understood to refer to steric and optical isomers.

For the purposes of the present invention, a halogen is preferably chosen from F, Cl, Br and I, and preferably from F and Cl. Within the context of the present invention, consideration is in particular given to compounds of formula (I) in which one or more alkyl radicals are perfluorinated radicals.

According to a preferred variant, R is an alkyl or cycloalkyl radical having 1 to 5 carbon atoms, optionally substituted by one or more halogen atoms.

According to another preferred variant, n is an integer varying from 1 to 6.

According to a first preferred embodiment, the compound corresponds to general formula (I) in which:
n is an integer varying from 1 to 6,
X represents an atom chosen from O and S, or a divalent group chosen from —SO—, —SO$_2$— and —NR'— with R' being a hydrogen atom or a C$_1$ to C$_5$ alkyl radical,
R$^1$, R$^2$ and R$^3$ independently of one another represent a hydrogen or halogen atom, a C$_1$ to C$_5$ alkyl radical or a group chosen from —OH, —COOH, —COOR", —OR" and —SO$_2$R", with R" being a C$_1$ to C$_5$ alkyl radical, with alkyl radicals optionally substituted by one or more halogen atoms or hydroxyl groups,
R represents a C$_1$ to C$_5$ alkyl or cycloalkyl radical, optionally substituted by one or more halogen atoms,
the symbol ═ indicates a single bond or a double bond in position 2, 3 or 4 of the 7-member used heterocycle, with at least one double bond being present, and
A represents a radical chosen from phenyl, thiophenyl or pyridinyl radicals, optionally substituted by one or more halogen atoms, by one or more groups chosen from —OH, —COOH, —COOR'", —OR'" and —SO$_2$R'", with R'" being a C$_1$ to C$_5$ alkyl radical, or by one or more C$_1$ to C$_5$ alkyl radicals optionally substituted by one or more halogen atoms or hydroxyl groups,
and organic or inorganic salts thereof and isomers thereof.

According to another preferred embodiment of the invention, the compound of general formula (I) more particularly corresponds to the formula (Ia):

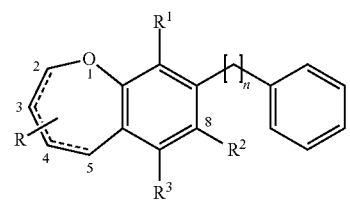

and organic or inorganic salts thereof and isomers thereof, in which R$^1$, R$^2$, R$^3$, R and n are as defined above.

According to another preferred variant, the compound of general formula (I) more particularly corresponds to the formula (Ib)

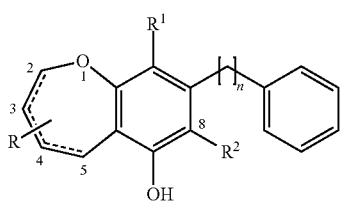

and organic or inorganic salts thereof and isomers thereof, in which $R^1$, $R^2$, R and n are as defined above.

According to another preferred variant, R in formula (I), (Ia) or (Ib) represents an alkyl radical having 1 to 3 carbon atoms, and more preferentially is methyl, the alkyl radical optionally being substituted by one or more halogen atoms.

According to another preferred variant, n in formula (I), (Ia) or (Ib) represents an integer varying from 1 to 3, and more preferentially is equal to 2.

According to another preferred variant, the fused heterocycle has only one double bond in position 2, 3 or 4, and preferably in position 3.

According to another preferred variant, $R^1$ in formula (I), (Ia) or (Ib) represents a hydrogen atom or a —COOH group, and preferably is a hydrogen atom.

According to a particular embodiment, $R^2$ in formula (I), (Ia) or (Ib) represents a hydrogen atom or a —COOH group, or a —COOR" group, with R" being a $C_1$ to $C_5$ alkyl radical, in particular with R" being methyl, and preferably a hydrogen atom or a —COOH group. Advantageously, $R^2$ in formula (I), (Ia) or (Ib) represents a —COOH group.

According to a preferred embodiment of the invention, the compound of general formula (I) is chosen from the following compounds and organic or inorganic salts and isomers thereof:

| Name | Structural formula |
|---|---|
| Compound A | 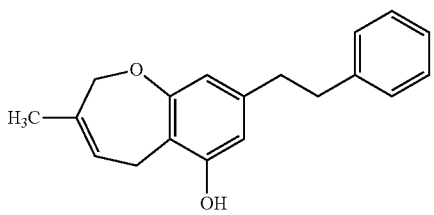 [SMILES: CC1=CCc2c(O)cc(CCc3ccccc3)cc2OC1] |
| Compound H | 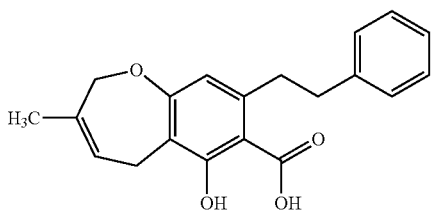 [SMILES: CC1=CCc2c(cc(CCc3ccccc3)c(C(=O)O)c2O)OC1] |
| Compound C | 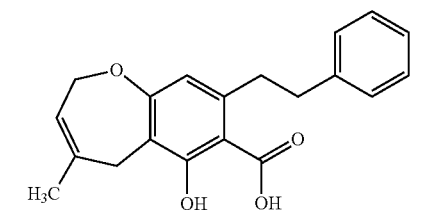 [SMILES: CC1=CCOc2cc(CCc3ccccc3)c(C(=O)O)c(O)c2C1] |

| Name | Structural formula |
|---|---|
| Compound D | |

Preferably, this compound is chosen from the compounds A, H and C and also salts thereof and isomers thereof.

In particular, the compound of formula (I) may be in accordance with the formula (Ic) as follows:

and one of the organic or inorganic salts and isomers thereof, position 3 or 4 being substituted by a radical R, with R, $R^1$ and n being as defined above.

In particular, this compound may be chosen from the compounds H and C and also salts thereof and isomers thereof.

According to a first embodiment, the compound according to the invention is used in an isolated, natural or synthetic form.

For the purposes of the invention, the term "isolated form" describes the situation where the compound according to the invention is used in a pure form, that is to say distinct from a mixture with other compounds, such as for example a plant extract containing said compound in combination with other substances.

Thus, these compounds can be isolated from plant extracts but can also be prepared synthetically, in particular as illustrated in the examples which follow. Various studies on the synthesis of such compounds are also detailed in the documents Stefinovic et al., J. Org. Chem. 1998, 63, 2808-2809; Yoshida et al., Tetrahedron 2009, 5702-2708; Yamaguchi et al., Tetrahedron 2000, 41, 4787-4790; Yamaguchi et al., J. Org. Chem. 2005, 70, 7505-7511.

According to another embodiment, the compound according to the invention is used in the form of a natural extract, in particular plant extract, containing said compound.

In particular, certain compounds according to the invention can be used in the form of an extract of hepatic plants containing said compound, in particular and without limitation: *Radula variabilis, R. complanata, R. buccinifera, R. japonica, R. oyamensis, R. tokiensis, R. perrottetii, R. javanica*, which generally contain a mixture of these compounds and other related compounds (Asakawa et al. Phytochemistry 1978, 17, 2005-2010; Phytochemistry 1978, 17, 2115-2117; Phytochemistry 1981, 20, 858-859; Phytochemistry 1982, 21, 2481-2490; Phytochemistry 1991, 30, 235-251; Phytochemistry 1991, 30, 325-328).

The extract can in particular be obtained by mechanical extraction, for example by pressing, or by chemical extraction, in particular by leaching, maceration or infusion. If necessary, the extraction can be followed by a step of purification by chromatography or crystallization.

According to yet another embodiment, the compound according to the invention can be generated in situ or just before use from a precursor, for example by hydrolysis, in particular of an ester.

Of course, the various compounds of formula (I) can be used in a mixture as herbicidal active substance according to the invention.

For the purposes of the invention, the term "herbicide" is understood to mean any compound or any composition having the property of killing so-called undesirable plants.

These so-called undesirable plants are generally mosses, algae or weeds, and in a nonlimiting manner in particular anthemis, amaranths, arabis, artemisia, orache, cornflower, shepherd's purse, bromes, cardamine, thistle, goosefoots, couch grass, poppy, jimsonweed, euphorbia, fumeworts, cleavers, galinsoga, geraniums, field gromwell, sow thistles, dead-nettles, toadflax, bindweed, pimpernel, wild mustard, forget-me-not, nettles, oxalis, peppergrass, field pansy, dandelion, plantains, wild radish, ryegrass, ranunculus, knotweed, groundsel, corn spurry, veronica and common vetch. For example, so-called undesirable plants may be those listed in the guide to weeds published by the Nouvelle-Aquitaine Direction Régionale de l'Alimentation, de l'Agriculture et de la Forêt [Regional Directorate for Food, Agriculture and Woodland].

As emerges from the examples below, the compounds according to the invention are very particularly advantageous as post-emergence herbicides.

They are particularly advantageous both as root-penetrating herbicides and as systemic herbicides.

In particular, the compounds according to the invention are used as a herbicide on plants at the seedling development stage, this involving a young germinated plant having only a few leaves.

Preferably, the compound is supplied to the plant via the growth medium.

This growth medium can be the soil but also the growing media considered for hydroponics cultures.

Advantageously, the compound is applied directly in contact with the growth medium on the surface of which the plants to be treated grow. As emerges from the examples below, the plant is killed in less than 96 h, preferably less than 48 h, and even more preferentially less than 24 h after application.

Of course, the compounds according to the invention are formulated in a formulation suitable for application thereof to the site to be treated.

In general, this formulation dedicated to the application is a liquid and generally aqueous formulation.

This liquid formulation may be provided as such to the user, that is to say ready for application.

It may also be a concentrated liquid formulation requiring dilution by the user just before use.

It may also be a formulation in solid form, of granule type for example, to be applied as such by the user or requiring dispersion in an aqueous medium before use.

In general, application in diluted form, in particular in an aqueous medium, is preferred.

In the examples below, the compounds tested are used at a concentration of compound(s) according to the invention ranging from 1 µg/mL to 200 µg/mL, preferably from 5 µg/mL to 100 µg/mL, and even more preferentially from 10 µg/mL to 100 µg/mL.

Of course, this effective concentration is liable to vary depending on the chemical nature of the compounds according to the invention and on the variety and the stage of development of the undesirable plants to be treated.

It is also advantageous that the dilution is suitable for being sprayed.

The invention also relates to a phytotoxic composition comprising, as active substance, at least one compound according to the invention.

This phytotoxic composition may comprise said compound in pure form or in the form of a plant extract containing said compound.

Advantageously, the compound according to the invention in said phytotoxic composition is combined with at least one additive chosen from fertilizers, growth regulators and auxiliary herbicides.

The expression "auxiliary herbicide" refers to a herbicide different than a compound of formula (I).

It may specifically be interesting to combine a compound according to the invention with an auxiliary herbicide having an efficacy which may in particular be complementary to that of the compounds according to the invention. However, this auxiliary herbicide is preferably a compound selected to have a lower impact on the environment.

The fertilizer is preferably a nitrogenous fertilizer, which may be chosen from urea, ammonium salts, in particular ammonium chloride, ammonium nitrate or ammonium sulfate, leather powder, bone powder or plant powder, ammonium potassium phosphate, or mixtures thereof.

Growth regulators may be chosen from maleic hydrazide, chlormequat chloride (for example Cyclocel®), auxin derivatives, and mixtures thereof. Advantageously, they are growth regulators of natural origin, in particular salicylic acid, salicylic acid salts such as ammonium salicylate, jasmonates, auxins, gibberellins, cytokinins, lunularic acid, abscisic acid, and mixtures thereof.

Auxiliary herbicides may be chosen from ammonium nonanoate, nonanoic acid, fatty acids of intermediate chain length and salts thereof, urea derivatives, borax, copper sulfate, carboxylic acids and salts thereof, nitrogen-based compounds, calcium salts, and mixtures thereof.

A composition according to the invention may also contain other, more conventional, auxiliary additives such as surfactants, antifoams, disintegrants, stabilizers, humectants, thickeners and pH regulators, for example. The choice of these additives is most often made with regard to the form considered for the composition.

In particular, a phytotoxic composition according to the invention may be in the form of a solid composition, in particular in the form of powder or granules, in particular suitable for aqueous dilution. The solid composition may also be dispersed directly on the zone to be weeded and dissolved by wetting.

A phytotoxic composition according to the invention may also be initially provided in the form of a liquid composition, in particular in concentrated or ready-to-use form, in particular in solution or in emulsion. Likewise, the composition in concentrated liquid form may be diluted before use by adding adjuvants, where necessary.

According to another of its aspects, the present invention relates to a method for controlling the development of and/or treating undesirable plants on the surface of a target zone, comprising contacting the target zone with an effective amount of at least one compound chosen from the compounds of general formula (I), (Ia) or (Ib) as defined above, and also organic or inorganic salts thereof and isomers thereof, or at least one phytotoxic composition as defined above.

Advantageously, the contacting takes place by spraying at least one compound or at least one composition as defined above.

The examples which follow are presented by way of illustration and without limiting the invention.

Example 1

Synthesis of Compound A

Step 1 Preparation of 5-(2-phenylethyl)-1,3-cyclohexadione

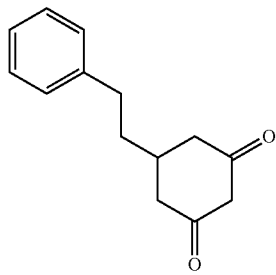 [SMILES: O=C1CC(=O)CC(CCc2ccccc2)C1]

Cinnamaldehyde is reacted in an aldol reaction with acetone (20 equivalents) in the presence of NaOH (1 equivalent) for 1 h at 0° C. to form cinnamylidene acetone. The 1,3-cyclohexadione is then obtained by an annelation reaction by condensation of cinnamylidene acetone with dimethyl malonate (1.1 equivalents) in the presence of NaOMe (1.1 equivalents) under reflux of the methanol for 12 h. After concentration under vacuum, the crude mixture is treated with an aqueous KOH solution (2N) at reflux for 2 h, then acidified to pH=2 with a 2N HCl solution and heated again under reflux for 2 h. Finally, the ketones purified by crystallization are converted by hydrogenation catalyzed by palladium on carbon (2 mol %) in MeOH to obtain the intermediate 5-(2-phenylethyl)-1,3-cyclohexadione.

Step 2 Preparation of the Intermediate Bicyclic Dihydrooxepin

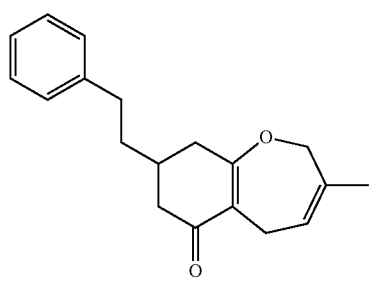 [SMILES: CC1=CCC2=C(CC(CCc3ccccc3)CC2=O)OC1]

$Cs_2CO_3$ (1.1 equivalents) is added to a solution of 5-(2-phenylethyl)-1,3-cyclohexadione (1 equivalent) in DMSO (0.1 mol/L) and the solution is stirred at 20° C. for 20 min. Then, a solution of 1,4-dibromo-2-methyl-2-butene (1.1 equivalents) in DMSO is added to the mixture at 20° C. The reaction mixture is stirred at 20° C. for 12 h, before being diluted with $Et_2O$ and quenched with cold water (0° C.). The organic phase is washed 3 times with brine (saturated NaCl solution). The aqueous phases are then extracted 3 times with diethyl ether. The combined organic extracts are dried over $Na_2SO_4$ and concentrated under reduced pressure, avoiding heating above 20° C. The residue is then purified by flash chromatography on silica gel using a refrigerated column (<10° C.) to afford the intermediate bicyclic dihydrooxepin as a 4:1 mixture of regioisomers methylated at positions 3 and 4, respectively.

Step 3 Preparation of Compound A

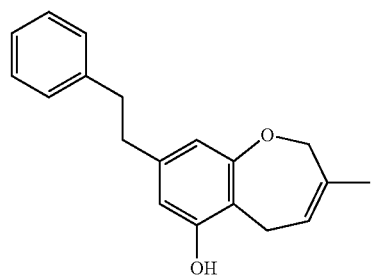 [SMILES: CC1=CCc2c(O)cc(CCc3ccccc3)cc2OC1]

The preceding compound is dihydroxylated in the presence of $K_2Os_2O_4.2H_2O$ (5 mol %) and of N-methylmorpholine N-oxide (1.3 equivalents) for 1 h in a 3:1 acetone/water mixture at 0° C. After concentration of the mixture, the reaction mixture is purified twice by silica chromatography (eluent 1: petroleum ether/ethyl acetate 6:4; eluent 2: dichloromethane/methanol 98:2) to afford the corresponding diol (white solid). This is then converted into dimesylate by action of methanesulfonic anhydride (5 equivalents) in pyridine. After 16 h at ambient temperature, the dimesylated product is extracted with ethyl acetate. The crude product is concentrated and diluted in DMSO, and then a solution of tetrabutylammonium fluoride in THF (1M, 5 equivalents) is added at 0° C. and the mixture is stirred for 1 h at ambient temperature (20° C.). After extraction with ethyl acetate and purification by silica chromatography (eluent: petroleum ether/ethyl acetate 9:1), compound A is obtained in the form of a colorless oil.

Compounds C, D and H are obtained in a similar manner to compound A, except for the decarboxylation of 1,3-cyclohexadione which is not considered for these 3 compounds.

Example 2

Synthesis of Compound D

Step 1 Preparation of 4-(methoxycarbonyl)-5-(2-phenylethyl)-1,3-cyclohexadione

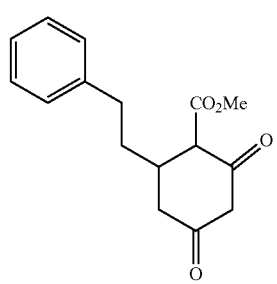 [SMILES: COC(=O)C1C(=O)CC(=O)CC1CCc1ccccc1]

As above, cinnamaldehyde is reacted in an aldol reaction with acetone (20 equivalents) in the presence of NaOH (1 equivalent) for 1 h at 0° C. to form cinnamylidene acetone. The 1,3-cyclohexadione is then obtained by an annelation reaction by condensation of cinnamylidene acetone with dimethyl malonate (1.1 equivalents) in the presence of NaOMe (1.1 equivalents) under reflux of the methanol for 12 h. The pH is then adjusted to 5 before concentration under reduced pressure and extraction of the aqueous residue with ethyl acetate. After concentration, the solid residue is washed with diethyl ether and then recrystallized in MeOH/Et$_2$O to obtain the intermediate in the form of a white solid. Finally, hydrogenation catalyzed by palladium on carbon (2 mol %) in MeOH makes it possible to obtain the intermediate 4-(methoxycarbonyl)-5-(2-phenylethyl)-1,3-cyclohexadione.

Step 2 Preparation of the Intermediate Bicyclic Dihydrooxepin

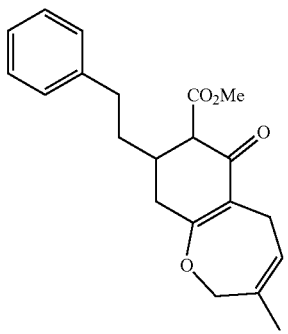 [SMILES: COC(=O)C1C(=O)C2=C(CC1CCc1ccccc1)OCC(C)=CC2]

Cs$_2$CO$_3$ (1.1 equivalents) is added to a solution of 4-(methoxycarbonyl)-5-(2-phenylethyl)-1,3-cyclohexadione (1 equivalent) in DMSO (0.1 mol/L) and the solution is stirred at 20° C. for 20 min. Then, a solution of 1,4-dibromo-2-methyl-2-butene (1.1 equivalents) in DMSO is added to the mixture at 20° C. The reaction mixture is stirred at 20° C. for 12 h, before being diluted with Et$_2$O and quenched with cold water (0° C.). The organic phase is washed 3 times with brine (saturated NaCl solution). The aqueous phases are then extracted 3 times with diethyl ether. The combined organic extracts are dried over Na$_2$SO$_4$ and concentrated under reduced pressure, avoiding heating above 20° C. The residue is then purified by flash chromatography on silica gel using a refrigerated column (<10° C.) to afford the intermediate bicyclic dihydrooxepin in the form of a 1:1 mixture of ester regioisomers and 4:1 mixture of methyl regioisomers.

Step 3 Preparation of Compound D

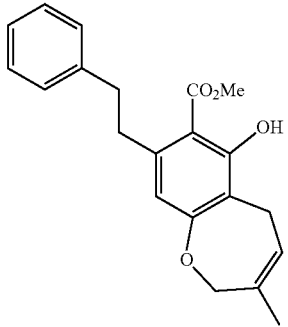 [SMILES: COC(=O)c1c(CCc2ccccc2)cc2c(c1O)CC=C(C)CO2]

The mixture of dihydrooxepins synthesized above is diluted in THF and NaH (1.2 equivalents) is added at 0° C. After 30 minutes, a solution of phenylselenium bromide (1.3 equivalents) in THF is added dropwise at 0° C. and then the mixture is stirred for 1 h. The mixture is extracted with diethyl ether, the organic phases are dried with Na$_2$SO$_4$ and the solvent is evaporated. The crude mixture is passed through a short silica column, eluting with 8:2 petroleum ether/ethyl acetate to afford the impure selenium intermediate. The latter is dissolved in dichloromethane and a 30% H$_2$O$_2$ solution is added in excess (>2 equivalents) at 0° C. After 1 hour at ambient temperature, the reaction is halted by addition of a saturated aqueous Na$_2$S$_2$O$_3$ solution. The mixture is extracted with diethyl ether and the organic phases are dried with Na$_2$SO$_4$. Purification by silica chromatography (eluent: 4:1 petroleum ether/dichloromethane) affords the pure compound D.

Example 3

Synthesis of Compound H

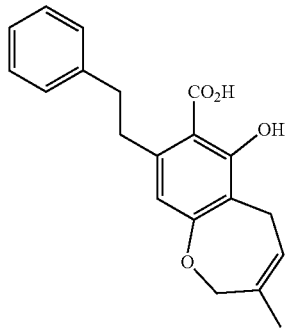 [SMILES: CC1=CCc2c(cc(CCc3ccccc3)c(C(=O)O)c2O)OC1]

Compound D is diluted in a 1:1 THF/water mixture and LiOH (2 equivalents) is added at ambient temperature. After stirring at 50° C. for 12 h, the reaction is halted by addition of an aqueous 1N HCl solution and extraction is performed with ethyl acetate. The organic phases are evaporated and the residue is chromatographed on silica (eluent: 5:3:2 petroleum ether/ethyl acetate/dichloromethane) to afford compound H in the form of colorless crystals.

Example 4

Synthesis of Compound C

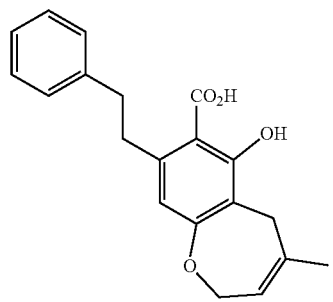 [SMILES: CC1=CCOc2cc(CCc3ccccc3)c(C(=O)O)c(O)c2C1]

Compound C, a methyl regioisomer of compound H, was obtained as a byproduct of the alkaline hydrolysis of a regioisomeric mixture of compound D, after purification.

Example 5

Synthesis of Compound E

Step 1 Preparation of the Intermediate Bicyclic Dihydrooxepin

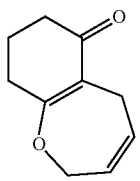 [SMILES: O=C1CCCC2=C1CC=CCO2]

Cs₂CO₃ (1.1 equivalents) is added to a solution of 1,3-cyclohexadione (1 equivalent) in DMSO (0.1 mol/L) and the solution is stirred at 20° C. for 20 min. Then, a solution of 1,4-dibromo-2-butene (1.1 equivalents) in DMSO is added to the mixture at 20° C. The reaction mixture is stirred at 20° C. for 12 h, before being diluted with Et₂O and quenched with cold water (0° C.). The organic phase is washed 3 times with brine (saturated NaCl solution). The aqueous phases are then extracted 3 times with diethyl ether. The combined organic extracts are dried over Na₂SO₄ and concentrated under reduced pressure, avoiding heating above 20° C. The residue is then purified by flash chromatography on silica gel using a refrigerated column (<10° C.) to afford the intermediate bicyclic dihydrooxepin.

Step 2 Preparation of Compound E (2,5-dihydrobenzoxepin)

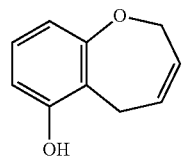 [SMILES: Oc1cccc2c1CC=CCO2]

The preceding compound is dihydroxylated in the presence of OsO₄ (5 mol %) and of N-methylmorpholine N-oxide (1.3 equivalents) in a 3:1 acetone/water mixture at 0° C. for 20 min. After concentration, the reaction mixture is purified by silica chromatography (eluent: ethyl acetate) to afford the corresponding diol (white crystals). This is then converted into dimesylate by action of methanesulfonyl chloride (5 equivalents) in pyridine. After 16 h at ambient temperature, the dimesylated product is extracted with ethyl acetate and the organic phases are washed with an aqueous 1N HCl solution, then with a saturated NaHCO₃ solution and then with brine. After drying over MgSO₄ and concentration, the dimesylate is obtained without further purification. The crude product is diluted in DMSO, and then a solution of tetrabutylammonium fluoride in THF (1M, 4 equivalents) is added at 0° C. and the mixture is stirred for 1 h at ambient temperature (20° C.). After extraction with ethyl acetate and purification by silica chromatography (eluent: 9:1 petroleum ether/ethyl acetate), compound E is obtained in the form of white crystals.

Example 6

Test of the Herbicidal Activity of Compounds in Accordance with the Invention and of a Comparative Compound The compounds were tested on *Arabidopsis thaliana* seedlings grown hydroponically at the cotyledon stage. Sterile seeds are germinated in the light in a culture plate, in the presence of 200 μL of nutrient medium.

After five days of culture (time 0 of the trial), the nutrient medium is replaced with an equivalent volume (200 μL) of this same medium containing the compound to be tested at different concentrations.

The results are summarized in table 2 below.

The manifestation of herbicidal activity is indicated by A for Active in the case where the plant is killed, that is to say when the two cotyledons have lost all of their green coloration, 24 h and 96 h after application of the product.

The absence of herbicidal activity is indicated by "N" for Not active, in the case where no biological activity is observed.

| | | Activity after 24 h | | | Activity after 96 h | | |
|---|---|---|---|---|---|---|---|
| Name | Structural formula | 100 μg/mL | 50 μg/mL | 10 μg/mL | 100 μg/mL | 50 μg/mL | 10 μg/mL |
| Compound A | 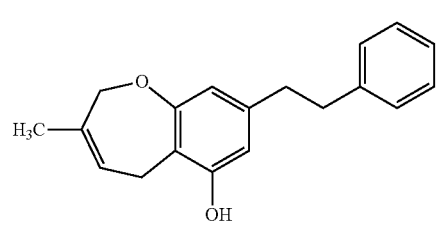 [SMILES: CC1=CCc2c(O)cc(CCc3ccccc3)cc2OC1] | A | A | N | A | A | N |

| Name | Structural formula | Activity after 24 h | | | Activity after 96 h | | |
|---|---|---|---|---|---|---|---|
| | | 100 μg/mL | 50 μg/mL | 10 μg/mL | 100 μg/mL | 50 μg/mL | 10 μg/mL |
| Compound H | | A | A | A | A | A | A |
| Compound C | | A | A | A | A | A | A |
| Compound D | | N | N | N | A | A | N |
| Compound E (comparative) | | N | N | N | N | N | N |

Thus, all of the compounds do indeed have a herbicidal effect, whereas a simplified analog without phenalkyl Ph(CH$_2$)$_n$ only has a very weak herbicidal effect on seedlings after 120 h at a high concentration of 100 μg/mL.

The invention claimed is:

1. A method of combating the proliferation of undesirable plants by contacting the undesirable plants with at least one compound chosen from the compounds of general formula (I)

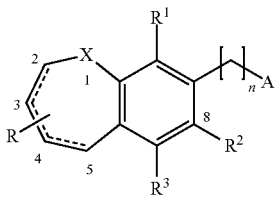

in which
n is an integer greater than or equal to 0,
X represents an atom chosen from O and S, or a divalent group chosen from —SO—, —SO$_2$— and —NR'— with R' being a hydrogen atom or a C$_1$ to C$_5$ alkyl or cycloalkyl radical, or aryl radical, R$^1$, R$^2$, R$^3$ and R independently of one another represent a hydrogen or halogen atom, a C$_1$ to C$_5$ alkyl or cycloalkyl radical or a group chosen from —OH, —COOH, —COOR", —OR" and —SO$_2$R", with R" being a C$_1$ to C$_5$ alkyl or cycloalkyl radical, with alkyl or cycloalkyl radicals optionally substituted by one or more halogen atoms or hydroxyl groups,
the symbol ═ indicates a single bond or a double bond in position 2, 3 or 4 of the 7-membered fused heterocycle, with at least one double bond being present, and
A represents a radical chosen from phenyl, naphthyl, furyl, thiophenyl, pyrrolyl, pyridinyl, indolyl, isoindolyl, benzofuryl, benzothiophenyl, quinolyl, isoquinolyl, imidazolyl, oxazolyl, thiazolyl, pyrimidyl, pyridazyl, pyrazyl, pyrazolyl, or triazolyl radicals, optionally substituted by one or more halogen atoms, by one or more groups chosen from —OH, —COOH, —COOR''', —OR''' and —SO$_2$R''', with R''' being a C$_1$ to C$_5$ alkyl or cycloalkyl radical, or by one or more C$_1$ to C$_5$ alkyl or cycloalkyl radicals optionally substituted by one or more halogen atoms or hydroxyl groups,
and organic or inorganic salts thereof and isomers thereof.

2. The method as claimed in claim 1, wherein R is an alkyl or cycloalkyl radical having 1 to 5 carbon atoms, optionally substituted by one or more halogen atoms.

3. The method as claimed in claim 1, wherein n is an integer varying from 1 to 6.

4. The method as claimed in claim 1, wherein
   n is an integer varying from 1 to 6,
   X represents an atom chosen from O and S, or a divalent group chosen from —SO—, —SO$_2$— and —NR'— with R' being a hydrogen atom or a C$_1$ to C$_5$ alkyl radical,
   R$^1$, R$^2$ and R$^3$ independently of one another represent a hydrogen or halogen atom, a C$_1$ to C$_5$ alkyl radical or a group chosen from —OH, —COOH, —COOR", —OR" and —SO$_2$R", with R" being a C$_1$ to C$_5$ alkyl radical, with alkyl radicals optionally substituted by one or more halogen atoms or hydroxyl groups,
   R represents a C$_1$ to C$_5$ alkyl or cycloalkyl radical, optionally substituted by one or more halogen atoms,
   the symbol ═ indicates a single bond or a double bond in position 2, 3 or 4 of the 7-membered fused heterocycle, with at least one double bond being present, and
   A represents a radical chosen from phenyl, thiophenyl or pyridinyl radicals, optionally substituted by one or more halogen atoms, by one or more groups chosen from —OH, —COOH, —COOR''', —OR''' and —SO$_2$R''', with R''' being a C$_1$ to C$_5$ alkyl radical, or by one or more C$_1$ to C$_5$ alkyl radicals optionally substituted by one or more halogen atoms or hydroxyl groups,
   and organic or inorganic salts thereof and isomers thereof.

5. The method as claimed in claim 1, wherein said compound of general formula (I) corresponds to the general formula (Ia):

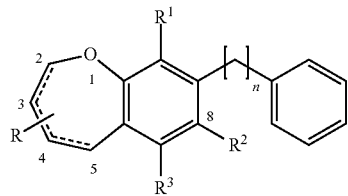

with R, R$^1$, R$^2$, R$^3$ and n being as defined in any one of the preceding claims, and organic or inorganic salts thereof and isomers thereof.

6. The method as claimed in claim 1, wherein said compound corresponds to the general formula (Ib):

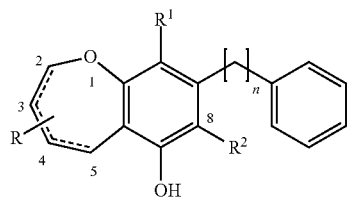

with R, R$^1$, R$^2$ and n being as defined in any one of the preceding claims, and organic or inorganic salts thereof and isomers thereof.

7. The method as claimed in claim 1, wherein R is an alkyl radical having 1 to 3 carbon atoms, the alkyl radical optionally being substituted by one or more halogen atoms.

8. The method as claimed in claim 1, wherein n is an integer varying from 1 to 3.

9. The method as claimed in claim 1, wherein the fused heterocycle has only one double bond in position 2, 3 or 4.

10. The method as claimed in claim 1, wherein R$^1$ is chosen from a hydrogen atom and a —COOH group.

11. The method as claimed in claim 1, wherein R$^2$ is chosen from a hydrogen atom, a —COOH group and a —COOR" group, with R" being a C$_1$ to C$_5$ alkyl radical.

12. The method as claimed in claim 1, wherein said compound corresponds to the general formula (Ic):

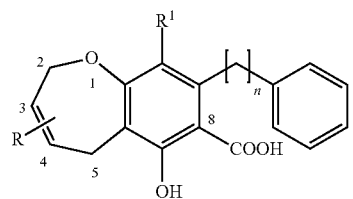

position 3 or 4 being substituted by a radical R, with R, R$^1$ and n being as defined in any one of the preceding claims, or one of the organic or inorganic salts and isomers thereof.

13. The method as claimed in claim 1, wherein said compound is chosen from:

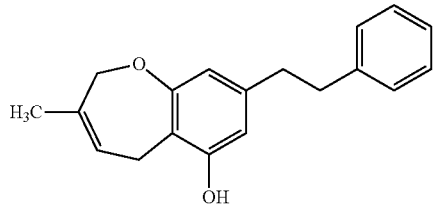

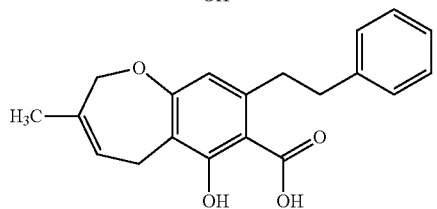

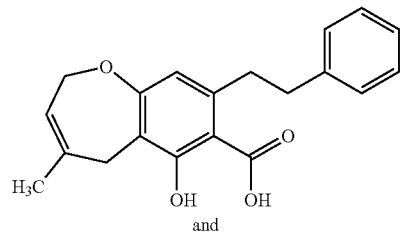

and

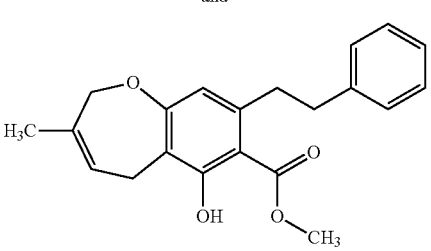

and organic or inorganic salts thereof and isomers thereof.

14. The method as claimed in claim 1, wherein said compound is used in an isolated, natural or synthetic form.

15. The method as claimed in claim 1, wherein said compound is used in the form of a plant extract containing said compound.

16. The method as claimed in claim 1, wherein said compound is used in the form of an extract of hepatic plants containing said compound.

17. The method as claimed in claim 1, wherein said compound is generated in situ or just before use from a precursor.

18. The method as claimed in claim 1, wherein said compound is used in a diluted form.

19. The method as claimed in claim 1, wherein said compound is a root-penetrating, systemic and/or post-emergence herbicide.

20. A phytotoxic composition comprising at least one compound as defined in any one of claims 1 to 19 in combination with at least one additive chosen from fertilizers, growth regulators and auxiliary herbicides.

21. The composition as claimed in claim 20, wherein it is in the form of a solid composition, or a liquid composition.

22. A method for controlling the development of and/or treating undesirable plants on the surface of a target zone, comprising contacting the target zone with an effective amount of at least one compound as defined in any one of claims 1 to 19 or at least one composition as claimed in either one of claims 20 and 21.

23. The method as claimed in claim 22, characterized in that the contacting takes place by spraying at least one compound as defined in any one of claims 1 to 19 or at least one composition as claimed in either one of claims 20 and 21.

24. The method as claimed in claim 1, wherein $R^2$ represents a —COOH group.

25. The method as claimed in claim 1, wherein said compound is chosen from:

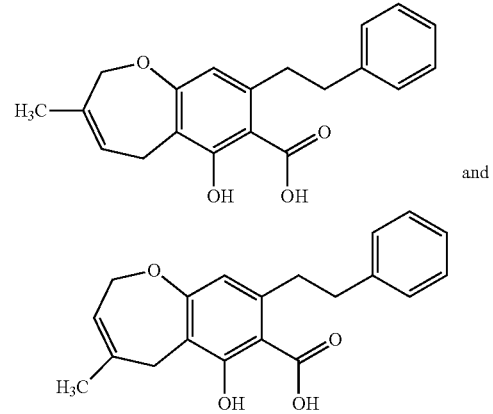

and organic or inorganic salts thereof and isomers thereof.

* * * * *